(12) United States Patent
Hoshi

(10) Patent No.: US 11,152,885 B2
(45) Date of Patent: Oct. 19, 2021

(54) ABNORMALITY DETECTION APPARATUS

(71) Applicant: Mitsubishi Electric Corporation, Tokyo (JP)

(72) Inventor: Takumi Hoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 375 days.

(21) Appl. No.: 16/328,364

(22) PCT Filed: Nov. 18, 2016

(86) PCT No.: PCT/JP2016/084237
§ 371 (c)(1),
(2) Date: Feb. 26, 2019

(87) PCT Pub. No.: WO2018/092261
PCT Pub. Date: May 24, 2018

(65) Prior Publication Data
US 2021/0281206 A1 Sep. 9, 2021

(51) Int. Cl.
*H02P 27/08* (2006.01)
*H02P 25/22* (2006.01)

(52) U.S. Cl.
CPC ............ *H02P 27/085* (2013.01); *H02P 25/22* (2013.01)

(58) Field of Classification Search
CPC ................................ H02P 27/085; H02P 25/22
See application file for complete search history.

(56) References Cited

U.S. PATENT DOCUMENTS

2017/0331409 A1* 11/2017 Andrieux ................ H02P 27/08
2017/0369094 A1* 12/2017 Ukai ...................... H02P 29/032
2018/0159518 A1* 6/2018 Poletto ..................... H02P 7/04

FOREIGN PATENT DOCUMENTS

JP  2013005604 A  1/2013
JP  2014159188 A  9/2014

OTHER PUBLICATIONS

International Search Report (PCT/ISA/210) dated Feb. 7, 2017, by the Japan Patent Office as the International Searching Authority for International Application No. PCT/JP2016/084237.
Written Opinion (PCT/ISA/237) dated Feb. 7, 2017, by the Japan Patent Office as the International Searching Authority for International Application No. PCT/JP2016/084237.

* cited by examiner

*Primary Examiner* — Muhammad S Islam
(74) *Attorney, Agent, or Firm* — Buchanan Ingersoll & Rooney PC

(57) ABSTRACT

An inverter control signal in each phase is input into a UVW-phase inverter circuit and an XYW-phase inverter circuit for controlling a motor including a plurality of winding groups in a UVW-phase and an XYZ-phase. The inverter control signal is generated as a pulse signal having a period depending on a rotation speed of the motor based on a current in each phase of the motor. An abnormality detection circuit has a function of detecting a pulse period of the inverter control signal in each phase and is configured to detect whether an abnormality occurs or not in motor control, depending on whether a predetermined large-small relation according to an arrangement order of the UVW-phase and the XYZ-phase is established or not in the pulse period of the inverter control signal in each phase during at least one of an acceleration state or a deceleration state of the motor.

5 Claims, 10 Drawing Sheets

FIG.10

POSITIVE ROTATION

| | COMPARISON TARGET | PULSE PERIOD COMPARISON CONDITION | ABNORMALITY DETECTABLE | | | | | |
|---|---|---|---|---|---|---|---|---|
| | | | U-PHASE | V-PHASE | W-PHASE | X-PHASE | Y-PHASE | Z-PHASE |
| 1 | U→(X)→V | $Tpu \geq (Tpx) \geq Tpv$ | 0 ABNORMALITY | ∞ ABNORMALITY | — | 0/∞ ABNORMALITY | — | — |
| 2 | (X)→V→(Y) | $(Tpx) \geq Tpv \geq (Tpy)$ | — | 0/∞ ABNORMALITY | — | 0 ABNORMALITY | ∞ ABNORMALITY | — |
| 3 | V→(Y)→W | $Tpv \geq (Tpy) \geq Tpw$ | — | 0 ABNORMALITY | ∞ ABNORMALITY | — | 0/∞ ABNORMALITY | — |
| 4 | (Y)→W→(Z) | $(Tpy) \geq Tpw \geq (Tpz)$ | — | — | 0/∞ ABNORMALITY | — | 0 ABNORMALITY | ∞ ABNORMALITY |
| 5 | W→(Z)→U | $Tpw \geq (Tpz) \geq Tpu$ | ∞ ABNORMALITY | — | 0 ABNORMALITY | — | — | 0/∞ ABNORMALITY |
| 6 | (Z)→U→(X) | $(Tpz) \geq Tpu \geq (Tpx)$ | 0/∞ ABNORMALITY | — | — | ∞ ABNORMALITY | — | 0 ABNORMALITY |

FIG.11

| PHASE | DIRECTION OF ABNORMALITY | 1 u–(X)–v | 2 (X)–v–(Y) | 3 v–(Y)–w | 4 (Y)–w–(Z) | 5 w–(Z)–u | 6 (Z)–u–(X) |
|---|---|---|---|---|---|---|---|
| U-PHASE | ∞ ABNORMALITY | NORMAL | NORMAL | NORMAL | NORMAL | ABNORMALITY DETECTED | ABNORMALITY DETECTED |
| | 0 ABNORMALITY | ABNORMALITY DETECTED | NORMAL | NORMAL | NORMAL | NORMAL | ABNORMALITY DETECTED |
| V-PHASE | ∞ ABNORMALITY | ABNORMALITY DETECTED | ABNORMALITY DETECTED | NORMAL | NORMAL | NORMAL | NORMAL |
| | 0 ABNORMALITY | NORMAL | NORMAL | ABNORMALITY DETECTED | NORMAL | NORMAL | NORMAL |
| W-PHASE | ∞ ABNORMALITY | NORMAL | NORMAL | ABNORMALITY DETECTED | ABNORMALITY DETECTED | NORMAL | NORMAL |
| | 0 ABNORMALITY | NORMAL | NORMAL | NORMAL | NORMAL | ABNORMALITY DETECTED | NORMAL |
| X-PHASE | ∞ ABNORMALITY | ABNORMALITY DETECTED | NORMAL | NORMAL | NORMAL | ABNORMALITY DETECTED | NORMAL |
| | 0 ABNORMALITY | ABNORMALITY DETECTED | ABNORMALITY DETECTED | NORMAL | NORMAL | NORMAL | NORMAL |
| Y-PHASE | ∞ ABNORMALITY | NORMAL | ABNORMALITY DETECTED | ABNORMALITY DETECTED | NORMAL | NORMAL | NORMAL |
| | 0 ABNORMALITY | NORMAL | NORMAL | NORMAL | ABNORMALITY DETECTED | ABNORMALITY DETECTED | NORMAL |
| Z-PHASE | ∞ ABNORMALITY | NORMAL | NORMAL | NORMAL | ABNORMALITY DETECTED | ABNORMALITY DETECTED | NORMAL |
| | 0 ABNORMALITY | NORMAL | NORMAL | NORMAL | NORMAL | ABNORMALITY DETECTED | ABNORMALITY DETECTED |

ABNORMALITY DETECTION APPARATUS

TECHNICAL FIELD

The present disclosure relates to an abnormality detection apparatus, and more particularly to an abnormality detection apparatus used in a motor controller having a function of controlling a multiple-winding motor including a plurality of winding groups.

BACKGROUND ART

In a system requiring high safety, each component in the system may be required to have a self-diagnosis function of detecting an abnormality. Thus, a motor mounted in such a system is required to have a self-diagnosis function of detecting an abnormality in a motor controller.

For example, Japanese Patent Laying-Open No. 2014-159188 (PTL 1) discloses motor control in an inverted two-wheel vehicle including two motors for driving right and left wheels. Specifically, it discloses a configuration in which windings insulated from each other are doubly disposed in the same phase and control systems including sensors are also duplexed, so as to achieve a self-diagnosis function of detecting an abnormality in a control system when the difference between (i) the deviation between the motor output value detected by the first control system and a target value and (ii) the deviation between the motor output value detected by the second control system and the target value exceeds a prescribed threshold value.

Furthermore, Japanese Patent Laying-Open No. 2013-5604 (PTL 2) discloses a power converter controller for controlling a multiple-winding motor. Specifically, it discloses the technique for reducing a switching loss and a low-order harmonic component that occur in a power converter configured to control a multiple-winding motor including a UVW-phase winding group and a XYZ-phase winding group.

CITATION LIST

Patent Literature

PTL 1: Japanese Patent Laying-Open No. 2014-159188
PTL 2: Japanese Patent Laying-Open No. 2013-5604

SUMMARY OF INVENTION

Technical Problem

In PTL 1, the configuration including two controllers for two motors is utilized to duplex each control system so as to perform the control operation for both motors, thereby implementing a self-diagnosis function of detecting an abnormality in a motor control system.

However, when a control system is duplexed for the controller of one multiple-winding motor as disclosed in PTL 2, the circuit scale is doubled for a self-diagnosis function, which is not preferable in terms of cost.

The present disclosure has been made in order to solve the above-described problems. An object of the present disclosure is to implement a function of detecting an abnormality in a multiple-winding motor controller including a plurality of winding groups without duplexing a control system.

Solution to Problem

In an aspect of the present disclosure, an abnormality detection apparatus is used for a motor controller having a function of controlling a motor including a plurality of windings each disposed in a corresponding one of a plurality of phases arranged in a predetermined order, the plurality of windings being divided into a first winding group and a second winding group that are insulated from each other. The abnormality detection apparatus includes a first period measurement circuit, a second period measurement circuit and a period comparison circuit. The first period measurement circuit is configured to receive a plurality of first control signals to a first power converter for controlling a voltage applied to the first winding group. The second period measurement circuit is configured to receive a plurality of second control signals to a second power converter for controlling a voltage applied to the second winding group. In each of phases corresponding to the first winding group among the plurality of phases, the plurality of first control signals each are generated as a pulse signal having a period depending on a rotation speed of the motor based on a current detected in each of the phases corresponding to the first winding group in the motor. In each of phases corresponding to the second winding group among the plurality of phases, the plurality of second control signals each are generated as a pulse signal having a period depending on a rotation speed of the motor based on a current detected in each of the phases corresponding to the second winding group in the motor. The first period measurement circuit is configured to measure pulse periods of the plurality of first control signals. The second period measurement circuit is configured to measure pulse periods of the plurality of second control signals. The period comparison circuit is configured to detect an abnormality in the motor controller based on a comparison of the pulse periods of the plurality of first control signals or the pulse periods of the plurality of second control signals in each of the plurality of phases. The pulse periods of the plurality of first control signals are measured by the first period measurement circuit, and the pulse periods of the plurality of second control signals are measured by the second period measurement circuit. The period comparison circuit is configured to detect whether the abnormality occurs or not depending on whether a predetermined large-small relation according to an arrangement order of the plurality of phases is established or not in the pulse periods of the plurality of phases during at least one of an acceleration state time period and a deceleration state time period of the motor.

Advantageous Effects of Invention

According to the present disclosure, it becomes possible to implement a function of detecting an abnormality in a multiple-winding motor controller including a plurality of winding groups without duplexing a control system.

BRIEF DESCRIPTION OF DRAWINGS

FIG. 10 is a chart showing a list of detectable abnormalities in each combination of three adjacent phases.

FIG. 11 is a chart showing a list of the correspondence relation between abnormality detection patterns and abnormality details in combinations shown in FIG. 10.

DESCRIPTION OF EMBODIMENTS

Figure 1:
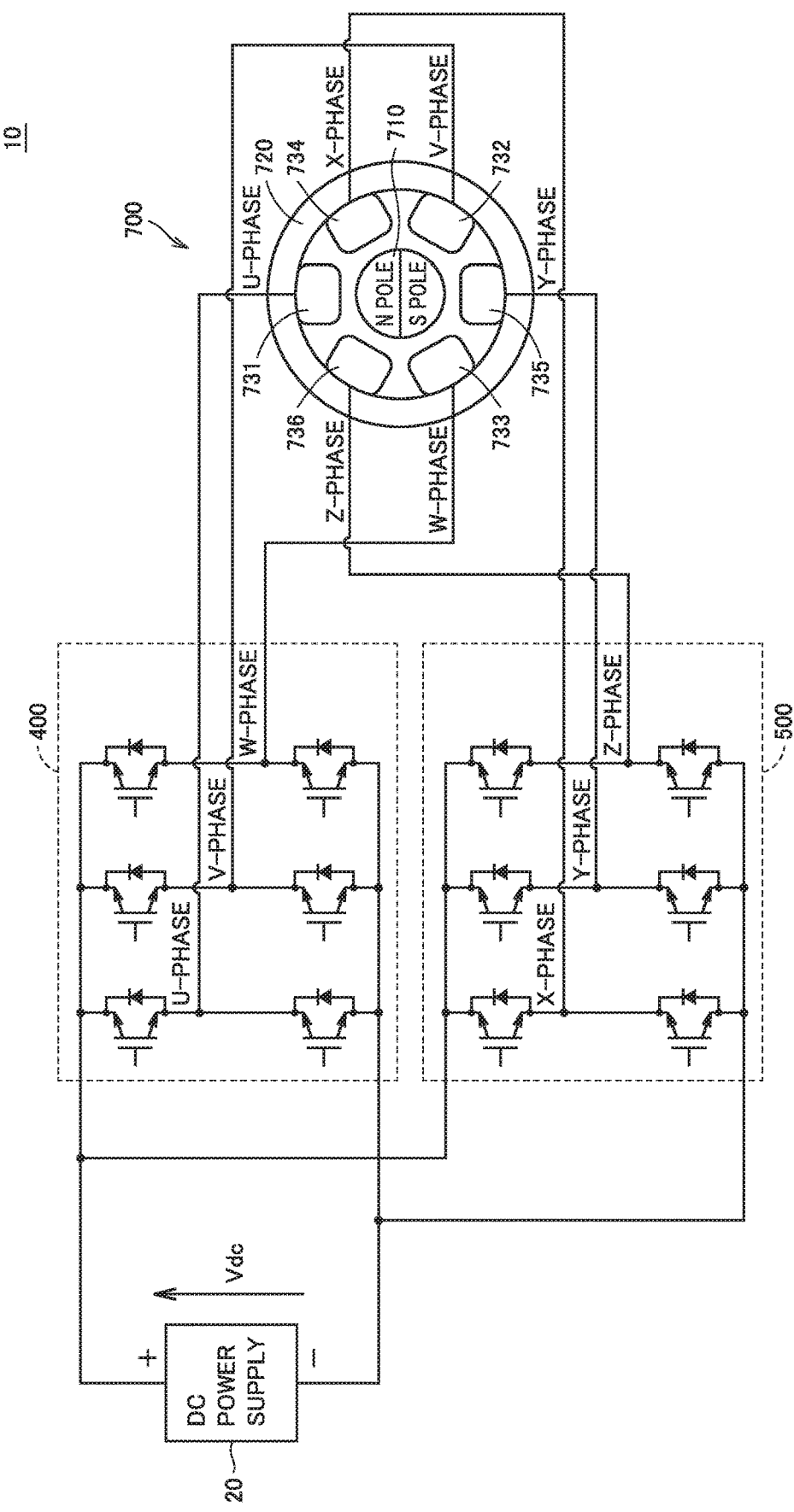
FIG. 1 is a block diagram showing the schematic configuration of a motor system controlled by a motor controller in which an abnormality detection apparatus according to the first embodiment is used.

The embodiments of the present disclosure will be hereinafter described with reference to the accompanying drawings. In the following description, the same or corresponding components are designated by the same reference characters, and description thereof will not be basically repeated.

First Embodiment

FIG. 1 is a block diagram showing the schematic configuration of a motor system controlled by a motor controller in which an abnormality detection apparatus according to the first embodiment is used.

Referring to FIG. 1, a motor system 10 includes a direct-current (DC) power supply 20, a UVW-phase inverter 400, an XYZ-phase inverter 500, and a motor 700.

Motor 700 includes a rotor 710 and a stator 720. FIG. 1 shows an example of motor 700 as a permanent-magnet type synchronous motor including rotor 710 provided with a permanent magnet. Stator 720 includes: a UVW-phase winding group formed of a U-phase winding 731, a V-phase winding 732 and a W-phase winding 733; and a XYZ-phase winding group formed of an X-phase winding 734, a Y-phase winding 735 and a Z-phase winding 736.

U-phase winding 731, V-phase winding 732 and W-phase winding 733 are displaced from each other by an angle of 120 degrees. Similarly, X-phase winding 734, Y-phase winding 735 and Z-phase winding 736 are displaced from each other by an angle of 120 degrees.

The U-phase, the V-phase, the W-phase, the X-phase, the Y-phase, and the Z-phase are arranged in a predetermined order such that the phases belonging to different winding groups are located adjacent to each other. For example, as shown in FIG. 1, windings 731 to 736 in their respective phases can be arranged such that the U-phase, the X-phase, the V-phase, the Y-phase, the W-phase, and the Z-phase (and the U-phase) are arranged in this order so as to be displaced from each other by 60 degrees in the clockwise direction with respect to the U-phase disposed at the twelve o' clock position.

DC power supply 20 can be configured of a power converter for converting alternating-current (AC) power from a commercial power supply into a DC voltage and/or a power storage device such as a battery. Furthermore, DC power supply 20 may be configured to have a function of variably controlling an output voltage Vdc (DC).

UVW-phase inverter 400 converts output voltage Vdc from DC power supply 20 into a three-phase AC voltage and applies the converted three-phase AC voltage to U-phase winding 731, V-phase winding 732 and W-phase winding 733. As shown in FIG. 1, UVW-phase inverter 400 can be implemented by a commonly-used configuration in which a semiconductor switching element is disposed in each of an upper arm and a lower arm in each of the U-phase, the V-phase and the W-phase.

U-phase winding 731 has one end electrically connected to a connection point between the semiconductor switching elements in the upper arm and the lower arm in the U-phase of UVW-phase inverter 400. Similarly, V-phase winding 732 and W-phase winding 733 each have one end electrically connected to the connection point between the semiconductor switching elements in the upper arm and the lower arm in a corresponding one of the V-phase and the W-phase of UVW-phase inverter 400. U-phase winding 731, V-phase winding 732 and W-phase winding 733 have the other ends interconnected to a neutral point (not shown).

XYZ-phase inverter 500 converts output voltage Vdc from DC power supply 20 into a three-phase AC voltage and applies the converted three-phase AC voltage to X-phase winding 734, Y-phase winding 735 and Z-phase winding 736. As shown in FIG. 1, XYZ-phase inverter 500 can also be implemented by a commonly-used configuration in which a semiconductor switching element is disposed in each of the upper arm and the lower arm in each of the X-phase, the Y-phase and the Z-phase. X-phase winding 734, Y-phase winding 735 and Z-phase winding 736 each have one end electrically connected to the connection point between the semiconductor switching elements in the upper arm and the lower arm in a corresponding one of the X-phase, the Y-phase and the Z-phase of XYZ-phase inverter 500. X-phase winding 734, Y-phase winding 735 and Z-phase winding 736 are interconnected at a neutral point (not shown) different from that of the UVW-phase.

Figure 2:
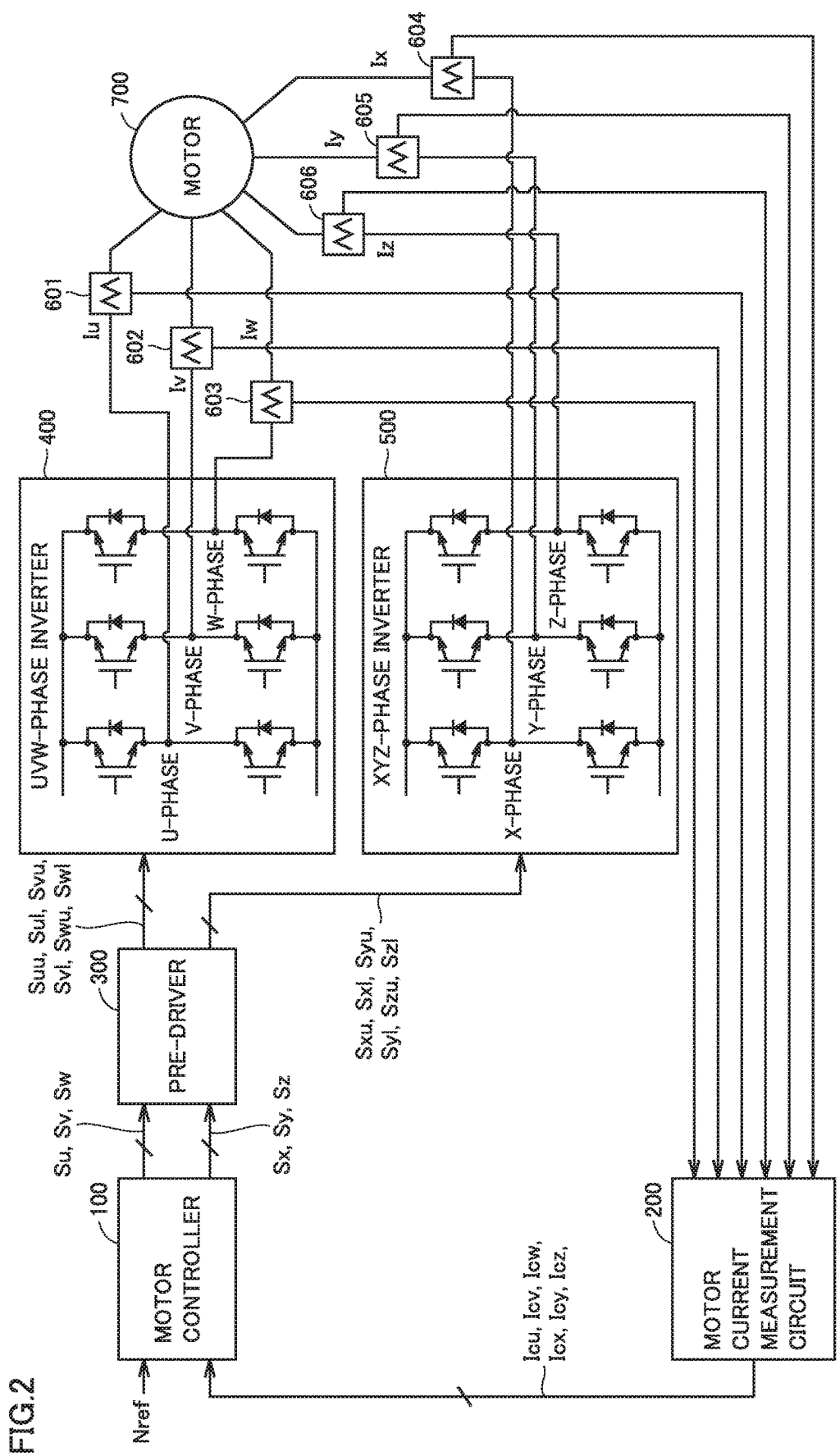
FIG. 2 is a block diagram illustrating the schematic configuration of motor control in the motor system shown in FIG. 1.

FIG. 2 is a block diagram illustrating the schematic configuration of motor control in the motor system shown in FIG. 1.

Referring to FIG. 2, UVW-phase inverter 400 and XYZ-phase inverter 500 generate three-phase AC voltages for operating motor 700 according to an operation command value (for example, a target rotation speed Nref of motor 700) and apply the generated three-phase AC voltages to the UVW-phase winding group and the XYZ-phase winding group, respectively. Furthermore, current detectors 601 to 606 are disposed for detecting a current generated in each of phases of motor 700 by the three-phase AC voltages applied by UVW-phase inverter 400 and XYZ-phase inverter 500.

The detected value of a U-phase current Iu by U-phase current detector 601, the detected value of a V-phase current Iv by V-phase current detector 602 and the detected value of a W-phase current Iw by W-phase current detector 603 are input into a motor current measurement circuit 200. Similarly, the detected value of an X-phase current Ix by X-phase current detector 604, the detected value of a Y-phase current Iy by Y-phase current detector 605 and the detected value of a Z-phase current Iz by Z-phase current detector 606 are input into motor current measurement circuit 200.

Based on the detected values by current detectors 601 to 606, motor current measurement circuit 200 outputs inverter on/off determination signals Icu, Icy, Icw, Icx, Icy, and Icz in each phase.

Figure 3:
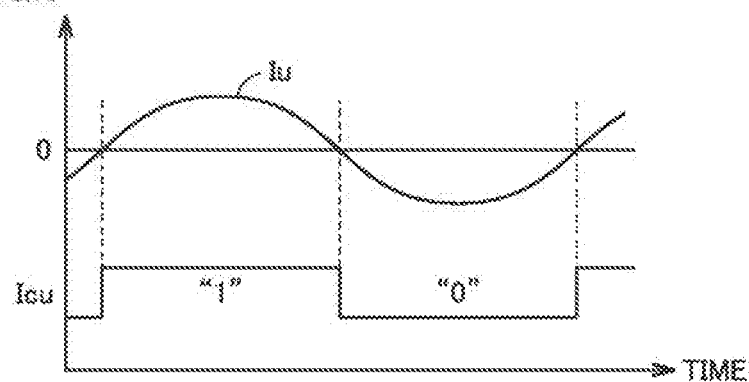
FIG. 3 is a conceptual waveform diagram for illustrating an inverter on/off determination signal output from a motor current measurement circuit shown in FIG. 2.

FIG. 3 is a conceptual waveform diagram for illustrating the inverter on/off determination signal output from motor current measurement circuit 200. FIG. 3 shows a waveform example of inverter on/off determination signal Icu in the U-phase by way of example.

Referring to FIG. 3, inverter on/off determination signal Icu is set at "1 (logic high level)" in the time period in which U-phase current Iu≥0 and set at "0 (logic low level)" in the time period in which U-phase current Iu<0. In this way, the inverter on/off determination signal in each phase is generated as a digital signal showing a pulse-like waveform so as to be set at "1" in the time period in which the current detection value in the phase is positive and to be set at "0" in the time period in which the current detection value is negative.

Accordingly, it is understood that the inverter on/off determination signal in each phase has a period in accordance with the rotation speed of motor 700. In other words, motor current measurement circuit 200 has a function of converting each phase current (an analog signal) of motor 700 into a digital signal for detecting the rotation speed of motor 700.

Again referring to FIG. 2, inverter on/off determination signals Icu, Icy, Icw, Icx, Icy, and Icz in each phase from motor current measurement circuit 200 are input into motor controller 100. Motor controller 100 can be representatively configured by a one-chip digital circuit. For example, a microcomputer, application specific integrated circuit (ASIC) and a field-programmable gate array (FPGA) can be used as motor controller 100.

Motor controller 100 generates inverter control signals Su, Sv, Sw, Sx, Sy, and Sz in each phase for controlling the rotation speed of motor 700 detected by the inverter on/off determination signal in each phase according to target rotation speed Nref. Inverter control signals Su, Sv and Sw correspond to the on/off control signals for the semiconductor switching elements in phases of UVW-phase inverter 400 for controlling the voltage applied from UVW-phase inverter 400 to U-phase winding 731, V-phase winding 732 and W-phase winding 733.

Similarly, inverter control signals Sx, Sy and Sz correspond to on/off control for the semiconductor switching elements in phases of XYZ-phase inverter 500 for controlling the voltage applied from XYZ-phase inverter 500 to X-phase winding 734, Y-phase winding 735 and Z-phase winding 736.

A pre-driver 300 receives inverter control signals Su, Sv and Sw in the UVW-phase to generate drive control signals Suu (U-phase upper arm), Sul (U-phase lower arm), Svu (V-phase upper arm), Svl (V-phase lower arm), Swu (W-phase upper arm), and Swl (W-phase lower arm) for the semiconductor switching elements in the upper and lower arms in each of the phases of UVW-phase inverter 400.

Similarly, pre-driver 300 receives inverter control signals Sx, Sy and Sz in the XYZ-phase to generate drive control signals Sxu (X-phase upper arm), Sxl (X-phase lower arm), Syu (Y-phase upper arm), Syl (Y-phase lower arm), Szu (Z-phase upper arm), and Szl (Z-phase lower arm) for the semiconductor switching elements in the upper and lower arms in each of the phases of XYZ-phase inverter 500. Generally, pre-driver 300 is configured to electrically insulate motor controller 100 from UVW-phase inverter 400 and XYZ-phase inverter 500 using a photo coupler or the like.

Drive control signals Suu, Sul, Svu, Svl, Swu, and Swl are input into UVW-phase inverter 400. Similarly, drive control signals Sxu, Sxl, Syu, Syl, Szu, and Szl are input into XYZ-phase inverter 500.

In this way, by controlling UVW-phase inverter 400 according to inverter control signals Su, Sv and Sw, a pseudo-AC voltage obtained by switching output voltage Vdc (DC) on DC power supply 20 can be set as a voltage to be applied to U-phase winding 731, V-phase winding 732 and W-phase winding 733. Similarly, by controlling XYZ-phase inverter 500 according to inverter control signals Sx, Sy and Sz, a pseudo-AC voltage obtained by switching output voltage Vdc (DC) on DC power supply 20 can be set as a voltage to be applied to X-phase winding 734, Y-phase winding 735 and Z-phase winding 736. According to the periods and the effective values (or the fundamental wave components) of these applied voltages, the rotation speed and the rotation direction of motor 700 (rotor 710) can be controlled.

Figure 4:
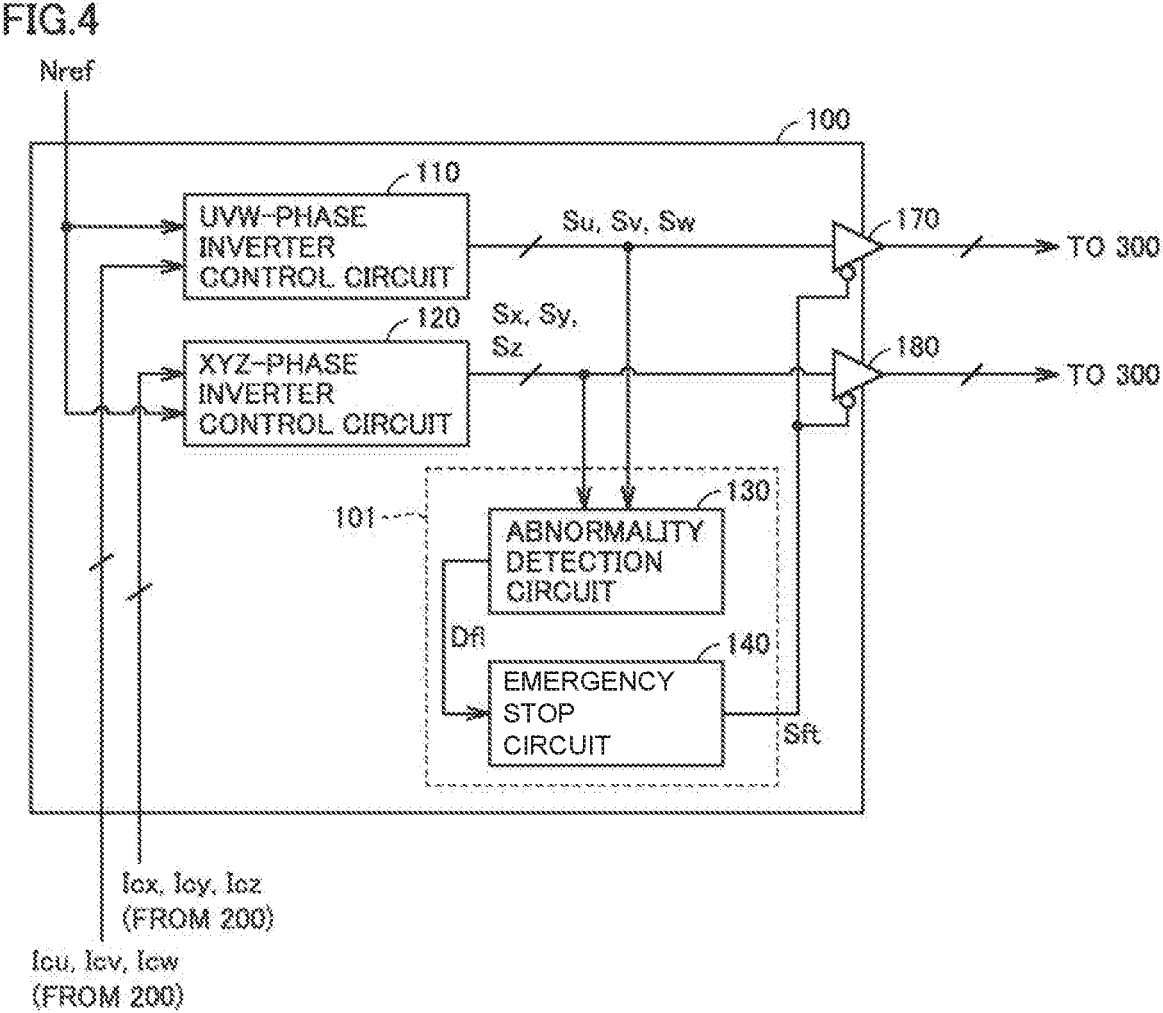
FIG. 4 is a functional block diagram for further illustrating the configuration of the motor controller shown in FIG. 2.
Figure 5:
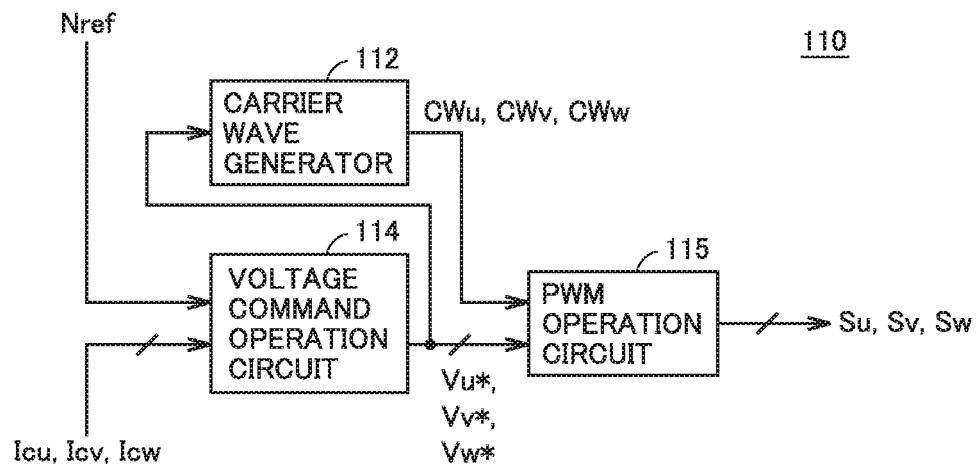
FIG. 5 is a functional block diagram for further illustrating the configuration of a UVW-phase inverter control circuit shown in FIG. 4.
Figure 6:
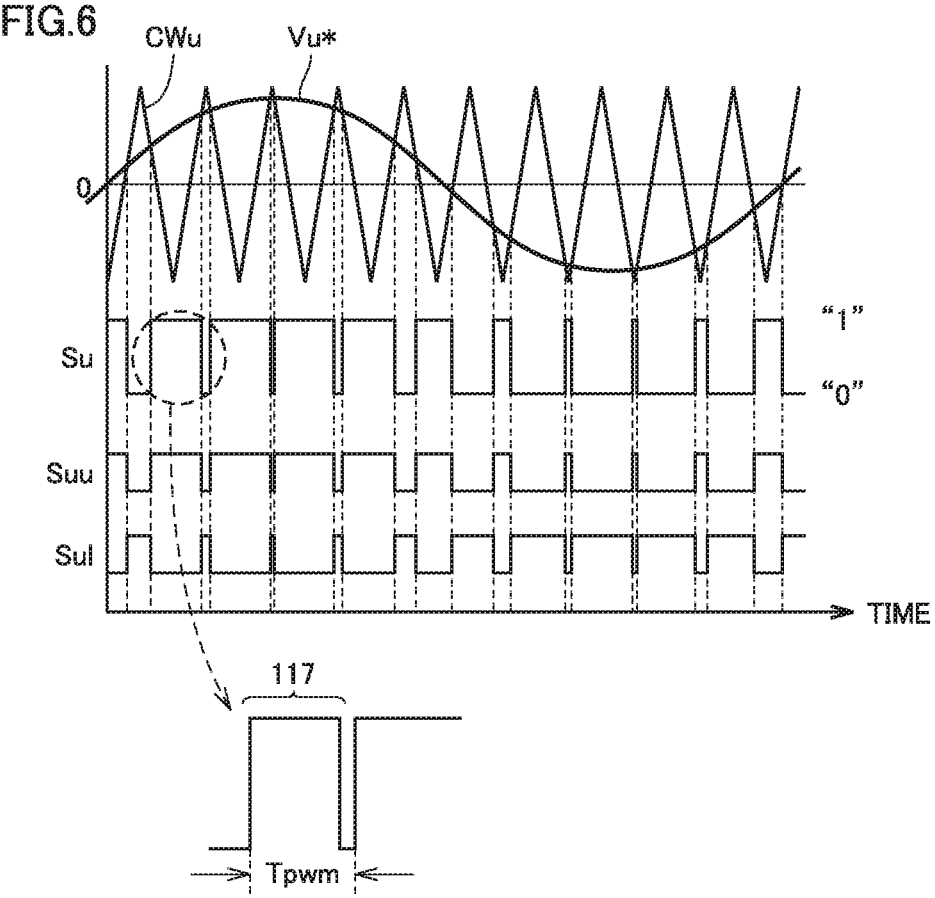
FIG. 6 is a conceptual waveform diagram for illustrating PWM control by the UVW-phase inverter control circuit.

Referring to FIGS. 4 to 6, the details of motor control by motor controller 100 will be further hereinafter described. As will be apparent in the later explanation, the abnormality detection apparatus according to the present embodiment is characterized by implementing a self-diagnosis function for detecting an abnormality based on monitoring of the control signal used for motor control.

FIG. 4 is a functional block diagram for illustrating the configuration of motor controller 100 in detail. In the following description, each functional block shown as components of motor controller 100 is implemented by software processing by execution of the software stored in advance and/or hardware processing by a dedicated electronic circuit (a logic circuit).

Referring to FIG. 4, motor controller 100 includes a UVW-phase inverter control circuit 110, an XYZ-phase inverter control circuit 120, and gate circuits 170, 180. Abnormality detection apparatus 101 according to the first embodiment includes an abnormality detection circuit 130 and an emergency stop circuit 140.

In the configuration example in FIG. 4, abnormality detection apparatus 101 is incorporated in motor controller 100 and formed on the same chip. In other words, abnormality detection circuit 130 and emergency stop circuit 140 each are implemented as a functional block of motor controller 100.

UVW-phase inverter control circuit 110 generates inverter control signals Su, Sv and Sw in the UVW-phase based on inverter on/off determination signals Icu, Icy and Icw from motor current measurement circuit 200 and target rotation speed Nref. For example, UVW-phase inverter control circuit 110 generates inverter control signals Su, Sv and Sw such that the voltage applied from UVW-phase inverter 400 is PWM (pulse width modulation)-controlled.

FIG. 5 shows a functional block diagram for further illustrating the configuration of UVW-phase inverter control circuit 110.

Referring to FIG. 5, UVW-phase inverter control circuit 110 includes a carrier wave generation circuit 112, a voltage command operation circuit 114, and a PWM operation circuit 115.

Based on the periods of inverter on/off determination signals Icu, Icy and Icw and target rotation speed Nref, voltage command operation circuit 114 generates voltage command values Vu*, Vv* and Vw* in the UVW-phase for feedback-controlling the motor rotation speed. Carrier wave generation circuit 112 generates carrier waves CWu, CWv and CWw having frequencies equal to the integral multiples of voltage command values Vu*, Vv* and Vw*. For example, carrier waves CWu, CWv and CWw each can be a triangular wave, a sawtooth wave and the like. PWM operation circuit 115 generates inverter control signals Su, Sv and Sw according to the comparison between the carrier wave voltage and the voltage command value for each of the U-, V- and W-phases.

FIG. 6 shows a conceptual waveform diagram for illustrating PWM control by UVW-phase inverter control circuit 110.

Referring to FIG. 6, by voltage command operation circuit 114 (FIG. 5), voltage command value Vu* is generated as a sinusoidal AC voltage having a period according to the rotation speed command value of motor 700 in the next control period. In this case, the rotation speed command value is not target rotation speed Nref, but is calculated so as to compensate for the deviation between target rotation speed Nref and the present value of the rotation speed detected from the period of inverter on/off determination signal Icu. In this case, it is preferable that the rotation speed command value is calculated so as to gradually compensate for the deviation in consideration of the energy efficiency in motor 700.

The amplitude of voltage command value Vu* can be used for controlling the torque acting on motor 700. For example, by controlling the voltage amplitude based on the difference between the present value of the rotation speed and the rotation speed command value in the next control period, the speed can be smoothly controlled.

Carrier wave CWu is generated by carrier wave generation circuit 112 (FIG. 5) so as to have a frequency equal to the integral multiple (ten times higher in the example in FIG. 6) of the frequency of voltage command value Vu*. PWM operation circuit 115 (FIG. 5) generates inverter control signal Su in the U-phase according to the voltage comparison between carrier wave CWu and voltage command value Vu*. Specifically, PWM operation circuit 115 sets inverter control signal Su at "1" to turn on the upper arm element in the time period of Vu*>CWu, and sets inverter control signal Su at "0" to turn on the lower arm element in the time period of Vu*<CWu. Consequently, it is understood that a period Tpwm of each of pulses 117 constituting inverter control signal Su (which will be hereinafter also referred to as a "pulse period") is the same as the period of carrier wave CWu, and has a pulse period depending on the rotation speed of motor 700.

In the time period during which inverter control signal Su="1", pre-driver 300 (FIG. 2) sets the condition such that drive control signal Suu="1" and Sul="0" in order to turn on the upper arm element in the U-phase and to turn off the lower arm element in the U-phase. In contrast, in the time period during which inverter control signal Su="0", pre-driver 300 sets the condition such that drive control signals Sul="1" and Suu="0" in order to turn on the lower arm element in the U-phase and to turn off the upper arm element in the U-phase. Thereby, the pulse voltage forming a pseudo-sinusoidal voltage is applied to one end of U-phase winding 731 according to inverter control signal Su.

Also in the V-phase and the W-phase, voltage command values Vv* and Vw* are similarly generated. Then, inverter control signals Sv and Sw are generated according to the PWM control by voltage comparison between voltage command values Vv*, Vw* and carrier waves CWv, CWw. Thus, inverter control signals Sv and Sw each also have a pulse period depending on the rotation speed of motor 700 as in the case of inverter control signal Su. Voltage command value Vv* is generated so as to have a phase difference of 120 degrees with respect to voltage command value Vu*. Also, voltage command value Vw* is generated so as to have a phase difference of 120 degrees with respect to voltage command value Vv*.

Again referring to FIG. 4, XYZ-phase inverter control circuit 120 generates inverter control signals Sx, Sy and Sz in the XYZ-phase based on inverter on/off determination signals Icx, Icy and Icz from motor current measurement circuit 200 and target rotation speed Nref. For example, XYZ-phase inverter control circuit 120 generates inverter control signals Sx, Sy and Sz by PWM control as in UVW-phase inverter control circuit 110 that has been described with reference to FIGS. 5 and 6. Accordingly, inverter control signals Sx, Sy and Sz each also have a pulse period according to the rotation speed of motor 700 as in the case of inverter control signals Su, Sv and Sw.

Abnormality detection circuit 130 uses inverter control signals Su, Sv, Sw, Sx, Sy, and Sz to detect an abnormality in the motor control system including motor controller 100, and change an output signal Df1 having "0" as a default value into "1". Abnormality detection signal Sft output from emergency stop circuit 140 is set according to output signal Df1 from abnormality detection circuit 130, so that abnormality detection signal Sft is switched according to the abnormality detection result obtained by abnormality detection circuit 130. Specifically, abnormality detection signal Sft is set at "0" when abnormality detection circuit 130 does not detect an abnormality, and set at "1" when abnormality detection circuit 130 detects an abnormality. Abnormality detection signal Sft is input into each of gate circuits 170 and 180.

When abnormality detection signal Sft is "0", gate circuit 170 transmits inverter control signals Su, Sv and Sw from UVW-phase inverter control circuit 110 to pre-driver 300. Similarly, when abnormality detection signal Sft is "0", gate circuit 180 transmits inverter control signals Sx, Sy and Sz from XYZ-phase inverter control circuit 120 to pre-driver 300. Consequently, UVW-phase inverter 400 and XYZ-phase inverter 500 operate according to inverter control signals Su, Sv, Sw, Sx, Sy, and Sz, so that the AC voltage according to the PWM-controlled pulse voltage can be applied to windings 731 to 736 of motor 700.

On the other hand, when abnormality detection signal Sft is "1", gate circuits 170 and 180 interrupt transmission of inverter control signals Su, Sv, Sw, Sx, Sy, and Sz to pre-driver 300. At this time, pre-driver 300 is configured to set each of drive control signals Suu, Sul, Svu, Svl, Swu, and Swl (FIG. 2) for UVW-phase inverter 400 and each of drive control signals Sxu, Sxl, Syu, Syl, Szu, and Szl for XYZ-phase inverter 500 at "0". Alternatively, abnormality detection signal Sft may be directly input into pre-driver 300.

In this way, when abnormality detection circuit 130 detects an abnormality, each of the semiconductor switching elements constituting UVW-phase inverter 400 and XYZ-phase inverter 500 is forcedly turned off, so that the emergency stop operation for stopping application of the voltage to motor 700 can be performed.

Furthermore, in the present embodiment, U-phase winding 731, V-phase winding 732 and W-phase winding 733 constitute the "first winding group". Furthermore, UVW-phase inverter 400 corresponds to the "first power converter". Inverter control signals Su, Sv and Sw correspond to a "plurality of first control signals". Similarly, X-phase winding 734, Y-phase winding 735 and Z-phase winding 736 constitute the "second winding group". Furthermore, XYZ-phase inverter 500 corresponds to the "second power converter". Inverter control signals Sx, Sy and Sz correspond to a "plurality of second control signals".

Then, the configuration and the operation of abnormality detection circuit 130 will be hereinafter described in detail.

Figure 7:
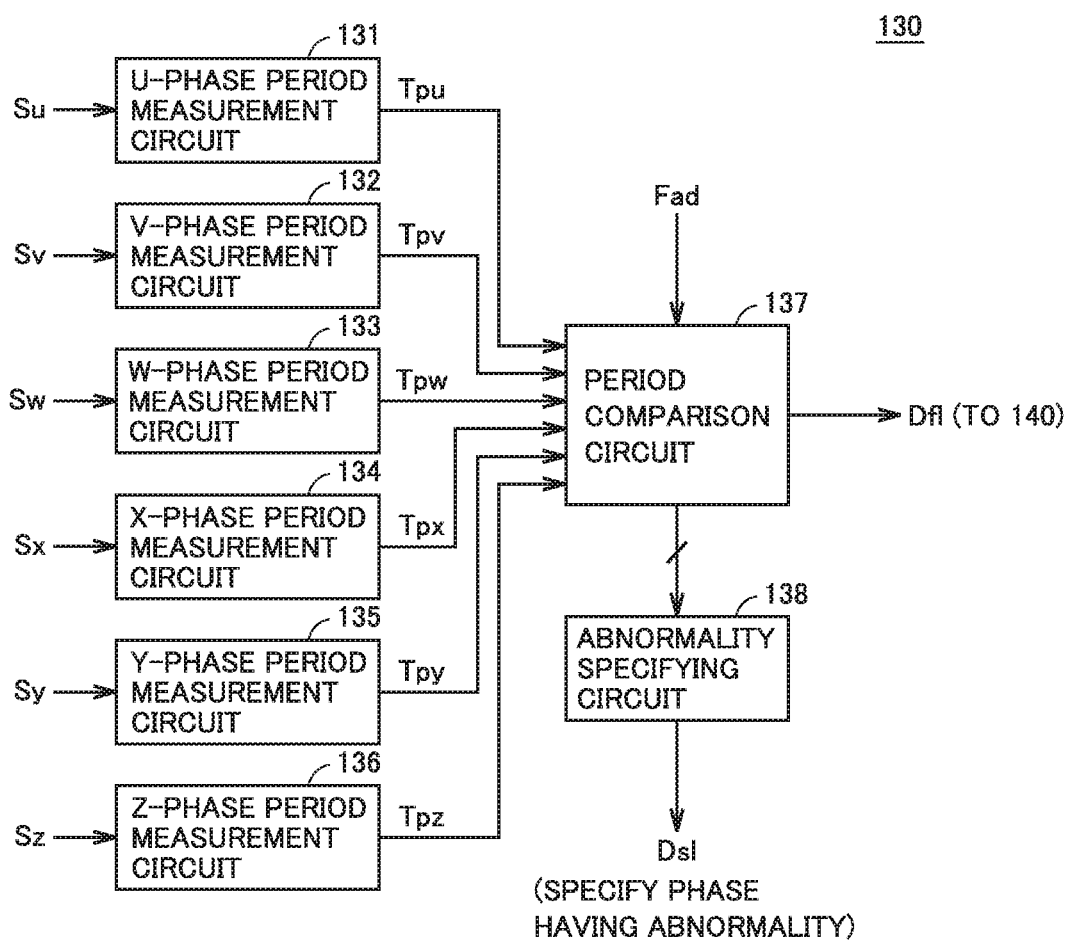
FIG. 7 is a functional block diagram for further illustrating the configuration of an abnormality detection circuit shown in FIG. 4.

FIG. 7 is a functional block diagram for further illustrating the configuration of abnormality detection circuit 130 shown in FIG. 4.

Referring to FIG. 7, abnormality detection circuit 130 includes period measurement circuits 131 to 136 in each phase, a period comparison circuit 137, and an abnormality specifying circuit 138.

Inverter control signals Su, Sv, Sw, Sx, Sy, and Sz are input into period measurement circuits 131, 132, 133, 134, 135, and 136, respectively. Period measurement circuit 131 in the U-phase is configured to measure a pulse period Tpwm (FIG. 6) of inverter control signal Su. Period measurement circuit 131 can be formed of a counter for increasing the counter value in a prescribed period. For example, each time the transition timing from "0" to "1" of inverter control signal Su occurs, period measurement circuit 131 can output a signal (for example, numerical value data formed of a plurality of bits) showing a pulse period Tpu (which will be hereinafter also referred to as a U-phase pulse period Tpu) of inverter control signal Su in accordance with the counter value corresponding to the elapsed time period from the previous transition timing from "0" to "1". Furthermore, for each transition timing, the counter value is reset in response to signal output, so that the pulse period of inverter control signal Su can be continuously measured. In other words, U-phase pulse period Tpu can be updated for each transition timing from "0" to "1" of inverter control signal Su.

Similarly, period measurement circuits 132, 133, 134, 135, and 136 continuously measure the pulse periods of inverter control signals Sv, Sw, Sx, Sy, and Sz in the Y-phase, the W-phase, the X-phase, the Y-phase, and the Z-phase, respectively, to output a V-phase pulse period Tpv, a W-phase pulse period Tpw, an X-phase pulse period Tpx, a Y-phase pulse period Tpy, and a Z-phase pulse period Tpz, respectively. V-phase pulse period Tpv, W-phase pulse period Tpw, X-phase pulse period Tpx, Y-phase pulse period Tpy, and Z-phase pulse period Tpz are also updated for each transition timing from "0" to "1" of inverter control signals Sv, Sw, Sx, Sy, and Sz, respectively.

Based on the comparison among U-phase pulse period Tpu, V-phase pulse period Tpv, W-phase pulse period Tpw, X-phase pulse period Tpx, Y-phase pulse period Tpy, and Z-phase pulse period Tpz output from period measurement circuits 131, 132, 133, 134, 135, and 136, respectively, period comparison circuit 137 detects an abnormality in the motor control system including motor controller 100.

In the configuration in FIG. 7, period measurement circuits 131 to 133 in the UVW-phase correspond to the "first period measurement circuit" while period measurement circuits 134 to 136 in the XYZ-phase correspond to the "second period measurement circuit".

Then, referring to FIGS. 8 and 9, an explanation will be hereinafter given with regard to the method of detecting an abnormality by abnormality detection circuit 130 based on comparison of the pulse periods of the inverter control signals among the phases.

Figure 8:
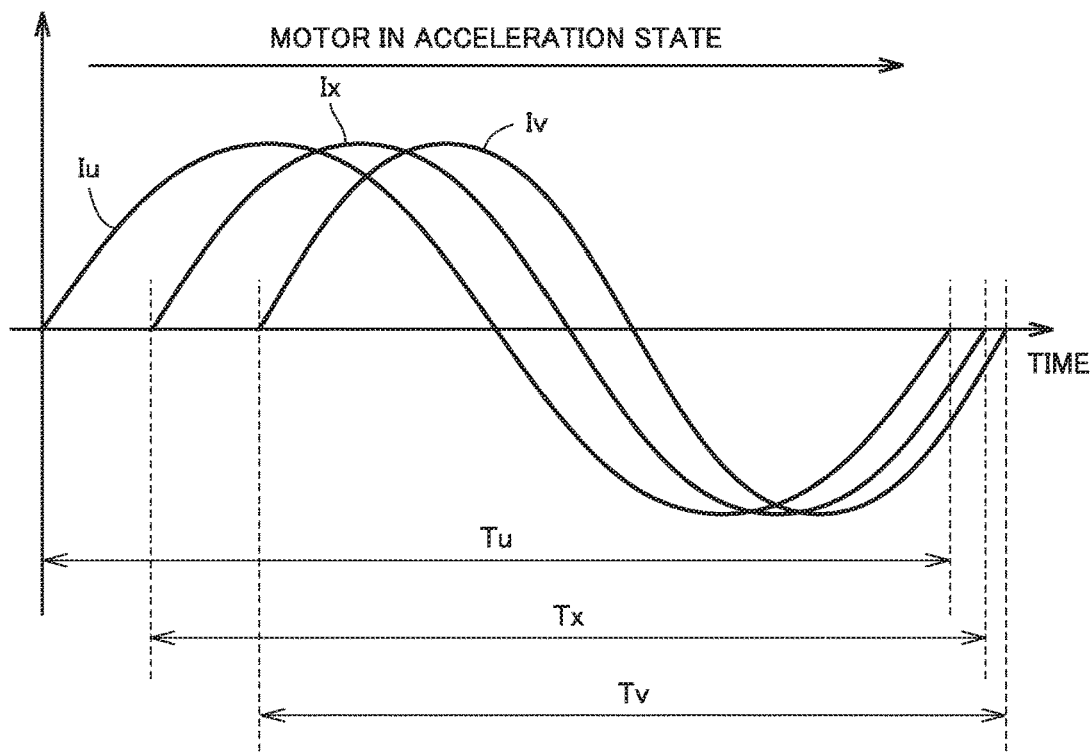
FIG. 8 is a conceptual waveform diagram illustrating motor currents in a U-phase, an X-phase and a V-phase in the acceleration state of a motor.

FIG. 8 shows a conceptual waveform diagram illustrating motor currents in the U-phase, the X-phase and the V-phase in the acceleration state of motor 700.

Referring to FIG. 8, the U-phase, the X-phase and the V-phase are arranged adjacent to each other according to the arrangement order shown in FIG. 1. Assuming that the rotation in the clockwise direction in FIG. 1 corresponds to the positive rotation direction, the pulse period becomes shorter in the order of U-phase current Iu, X-phase current Ix and V-phase current Iv (Tu>Tx>Tv) during acceleration in the positive rotation direction. Consequently, it is understood that the pulse periods of inverter control signals Su, Sx and Sv caused by motor control shown in FIG. 4 become also longer or shorter in accordance with current periods Tu, Tx and Tu.

Figure 9:
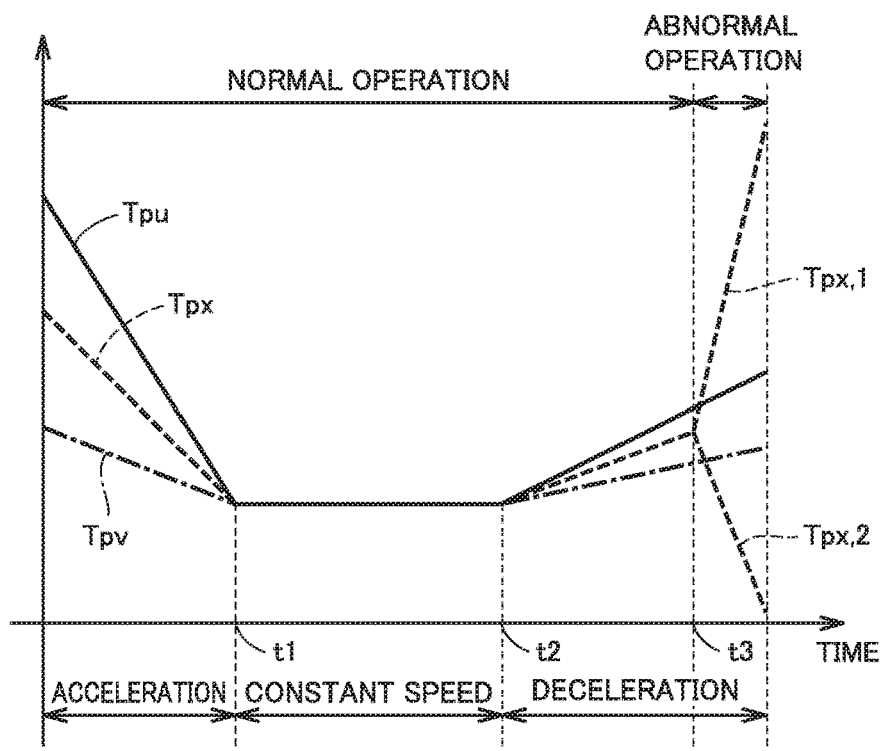
FIG. 9 is a conceptual diagram for illustrating the relation among the pulse periods of inverter control signals in the U-phase, the X-phase and the V-phase during each of the normal operation and the abnormal operation.

FIG. 9 shows a conceptual diagram for illustrating the relation among the pulse periods of the inverter control signals in the U-phase, the X-phase and the V-phase that are three phases adjacent to each other. The vertical axis in FIG. 9 shows U-phase pulse period Tpu, X-phase pulse period Tpx and V-phase pulse period Tpv measured by period measurement circuits 131, 134 and 132, respectively.

Referring to FIG. 9, during the normal operation until time t3, as the period of the motor current (that is, the periods of inverter on/off determination signals Icu, Icx and Icy) becomes shorter in accordance with an increase in rotation speed of motor 700, U-phase pulse period Tpu, X-phase pulse period Tpx and V-phase pulse period Tpv continuously decrease while maintaining the large-small relation of Tpu>Tpx>Tpv depending on the arrangement order, until the acceleration state (time t1).

In the constant speed state (time t1 to time t2), U-phase pulse period Tpu, X-phase pulse period Tpx and V-phase pulse period Tpv are equal (Tpu=Tpx=Tpv). In the deceleration state (time t2 to time t3), U-phase pulse period Tpu, X-phase pulse period Tpx and V-phase pulse period Tpv continuously increase while maintaining the large-small relation of Tpu>Tpx>Tpv depending on the arrangement order.

In this way, it is understood that, during the normal operation, the fixed large-small relation depending on the arrangement order is established among U-phase pulse period Tpu, X-phase pulse period Tpx and V-phase pulse period Tpv in each of the acceleration state and the deceleration state. On the other hand, when an abnormality occurs in motor control at and after time t3, this large-small relation is not established. In the example in FIG. 9, an abnormality occurs in the X-phase control system, so that Tpx is displaced from between Tpu and Tpv. This abnormality situation includes: the case where Tpx approaches infinity (∞) so that Tpx becomes longer than both Tpu and Tpv (Tpx, 1 in FIG. 9, which will be hereinafter also referred to as "∞ abnormality"); and the case where Tpx approaches zero so that Tpx becomes shorter than both Tpu and Tpv (Tpx, 2 in FIG. 9, which will be hereinafter also referred to as "0 abnormality").

As shown in FIG. 9, when the pulse periods are compared among the U-phase, the X-phase and the V-phase that are three phases adjacent to each other in motor 700, both "0 abnormailty" and "∞ abnormality" can be detected in the intermediate X-phase with respect to the relation of Tpu>Tpx>Tpv in the normal state.

When "0 Abnormality" occurs in the U-phase, the large-small relation of Tpu>Tpx>Tpv is not established. Accordingly, "0 abnormality" can be detected based on the comparison among Tpu, Tpx and Tpv. However, even when "∞ abnormality" occurs, the large-small relation of Tpu>Tpx>Tpv is maintained. Thus, "∞ abnormality" cannot be detected by comparing the pulse periods. Similarly, in the V-phase, based on the comparison of Tpu, Tpx and Tpv, "∞ abnormality" can be detected, but "0 Abnormality" cannot be detected.

The pulse periods comparison of the inverter control signals among the three adjacent phases in motor 700 can be performed also in other combinations. Accordingly, by sequentially changing the combinations, it becomes possible to monitor whether "0 abnormality" and "∞ abnormality" occur or not in each phase.

FIG. 10 shows a list of detectable abnormalities in each combination of three adjacent phases. FIG. 10 shows abnormality detected during the positive rotation. Also, the X-, Y- and Z-phases each are enclosed in parenthesis so as to be readily distinguished from the U-, V- and W-phases.

Referring to FIG. 10, in the combination of the U-phase, the X-phase and the V-phase, as described with reference to FIG. 9, when "0 abnormality" occurs in the U-phase, "∞ abnormality" occurs in the V-phase, "∞ abnormality" occurs in the X-phase, or "0 abnormality" occurs in the X-phase, the large-small relation of Tpu≥Tpx≥Tpv (the pulse period comparison condition) is not established. Accordingly, by comparison of the pulse periods in the extracted combination of the U-phase, the X-phase and the V-phase, the above-described abnormalities can be detected but other abnormalities cannot be detected. In addition, by defining the relation of Tpu=Tpx=Tpv as normal, it becomes possible to prevent an erroneous detection of abnormalities during transition from the acceleration state or the deceleration state to the constant speed state.

Then, in the combination of the X-phase, the V-phase and the Y-phase extracted as three adjacent phases, it becomes possible to detect "∞ abnormality" and "0 abnormality" in the intermediately located V-phase, "0 abnormality" in the X-phase and "∞ abnormality" in the Y-phase. Similarly, in the subsequently extracted combination of the V-phase, Y-phase and W-phase, it becomes possible to detect "∞ abnormality" and "0 abnormality" in the intermediately located Y-phase, "0 abnormality" in the V-phase and "∞ abnormality" in the W-phase.

Furthermore, in the extracted combination of the Y-phase, W-phase and Z-phase, it becomes possible to detect "∞ abnormality" and "0 abnormality" in the intermediately located W-phase, "0 abnormality" in the Y-phase and "∞ abnormality" in the Z-phase. In the extracted combination of the W-phase, Z-phase and U-phase, it becomes possible to detect "∞ abnormality" and "0 abnormality" in the intermediately located Z-phase, "0 abnormality" in the W-phase and "∞ abnormality" in the U-phase. Furthermore, in the extracted combination of the Z-phase, U-phase and X-phase, it becomes possible to detect "∞ abnormality" and "0 abnormality" in the intermediately located U-phase, "0 abnormality" in the Z-phase and "∞ abnormality" in the X-phase.

In this way, in each of Combinations 1 to 6, abnormalities can be detected based on the comparison of the pulse periods among the three adjacent phases. Specifically, in each of the combinations, it can be determined whether an abnormality occurs or not depending on whether a predetermined pulse period comparison condition is satisfied or not. It is understood from FIG. 10 that "∞ abnormality" and "0 abnormality" in each phase are included as an abnormality detection target only by Combinations 1 to 5. Thus, by the five combinations as described above, an abnormality detection in each phase regarding motor control can be covered.

Accordingly, when an abnormality is detected in any of the combinations as a result of comparing the pulse periods among the three adjacent phases in the above-mentioned five combinations during at least one of the acceleration state time period and the deceleration state time period of motor 700, period comparison circuit 137 detects an abnormality in motor control. Thereby, abnormality detection signal Sft changes from "0" to "1". In other words, during one or both of the acceleration state time period and the deceleration state time period, period comparison circuit 137 can determine whether the prescribed pulse period comparison condition for abnormality detection is satisfied or not. Specifically, the pulse period comparison condition corresponds to one embodiment of the "predetermined large-small relation".

For example, period comparison circuit 137 is configured to have a function (hardware or software) of determining whether the prescribed comparison conditions (FIG. 10) are satisfied or not, regarding the pulse periods in the three adjacent phases according to the above-mentioned five combinations among U-phase pulse period Tpu, V-phase pulse period Tpv, W-phase pulse period Tpw, X-phase pulse period Tpx, Y-phase pulse period Tpy, and Z-phase pulse period Tpz that are output from period measurement circuits 131, 132, 133, 134, 135, and 136, respectively.

In response to the result of detecting an abnormality (normal/abnormal) in the above-mentioned five combinations by period comparison circuit 137, abnormality specifying circuit 138 shown in FIG. 7 specifies abnormality details (that is, in which phase an abnormality occurs and which abnormality ("0 abnormality" or "∞ abnormality") occurs) when an abnormality is detected.

FIG. 11 shows a list of the correspondence relation between the abnormality details and the abnormality detection patterns in the combinations shown in FIG. 10.

Referring to FIG. 11, when "∞ abnormality" occurs in the U-phase, an abnormality is detected only in comparison of the pulse periods (Tpw≥Tpu≥Tpx) in Combination 5 (the W-phase, the Z-phase and the U-phase), as shown in FIG. 9. In contrast, when "∞ abnormality" occurs in the V-phase, an abnormality is detected in comparison of the pulse periods (Tpu≥Tpx≥Tpv and Tpx≥Tpv≥Tpy) in both Combination 1 (the U-phase, the X-phase and the V-phase) and Combination 2 (the X-phase, the V-phase and the Y-phase), as shown in FIG. 9.

Accordingly, it is determined in advance which pulse period among Combinations 1 to 5 an abnormality is detected by comparison (abnormality pattern) in each of "∞ abnormality" and "0 abnormality" in each phase. Thus, according to the correspondence relation shown in FIG. 11, abnormality specifying circuit 138 can specify the phase having an abnormality and the abnormality details ("0 abnormality"/"∞ abnormality"), based on the result of the detection by period comparison circuit 137 about an abnormality (normal/abnormal) in the above-mentioned five combinations.

For example, when a failure occurs in UVW-phase inverter control circuit 110 and/or XYZ-phase inverter control circuit 120, the inverter control signal in one of the phases shows an abnormal value, so that abnormality detection circuit 130 can detect an abnormality. Thereby, based on the comparison of the pulse periods of the inverter control signals used for motor control, the self-diagnosis function for the control operation by motor controller 100 can be implemented without duplexing the control system.

In this way, according to the abnormality detection apparatus of the first embodiment, by applying this abnormality detection apparatus to motor controller 100 having the function of controlling motor 700 including a plurality of winding groups in the UVW-phase and the XYX-phase, the abnormality detection function of the control operation in motor controller 100 can be implemented without duplexing the control operation.

Furthermore, also when a failure occurs in one of pre-driver 300 and inverters 400 and 500, an upper arm and/or a lower arm in one phase are/is fixed on or off, which causes an abnormality to occur in the inverter on/off determination signal, so that the inverter control signal shows an abnormal value. Thereby, an abnormality can be detected by the pulse period comparison in abnormality detection circuit 130.

Similarly, also when a failure occurs in motor current measurement circuit 200, an abnormality occurs in the inverter on/off determination signal, so that the inverter control signal shows an abnormal value. Thereby, an abnormality can be detected through the period comparison by abnormality detection circuit 130.

Accordingly, by applying abnormality detection apparatus 101 to motor controller 100, occurrence of an abnormality can be detected when a failure occurs not only in motor controller 100 (UVW-phase inverter control circuit 110 and XYZ-phase inverter control circuit 120) but also in one of motor current measurement circuit 200, pre-driver 300 and inverters 400, 500.

Furthermore, during the negative direction rotation of motor 700 (during the counterclockwise rotation in FIG. 1), by reversing the direction of the inequality sign in the pulse period comparison condition in each of the combinations shown in FIG. 10 (for example, Tpu≤Tpx≤Tpv in Combination 1), similar abnormality detection can be performed in each of the acceleration state and the deceleration state.

In the present embodiment, UVW-phase inverter control circuit 110 and XYZ-phase inverter control circuit 120 perform the similar control operation. Thus, UVW-phase inverter control circuit 110 performs the control operation for generating an inverter control signal in the XYZ-phase and XYZ-phase inverter control circuit 120 performs the control operation for generating an inverter control signal in the UVW-phase, thereby allowing self-diagnosis by duplexing. However, as having been described with reference to FIG. 9, in the acceleration state and the deceleration state, the control operation results are different between the UVW-phase and the XYZ-phase. Thus, such self-diagnosis by duplexing may erroneously detect an abnormality except in the strictly constant speed state. In contrast, the abnormality detection apparatus according to the present embodiment can appropriately detect an abnormality in motor control in each of the acceleration state and the deceleration state without erroneously detecting an abnormality in the constant speed state.

Second Embodiment

Motor controller 100 described in the first embodiment can be configured to be applicable also to controlling of the motor including only a winding group in the UVW-phase. The second embodiment will be described with regard to the abnormality detection function for the motor controller modified to be applicable to both a motor including only a winding group in the UVW-phase and a motor including a plurality of winding groups in the UVW-phase and the XYZ-phase.

Figure 12:
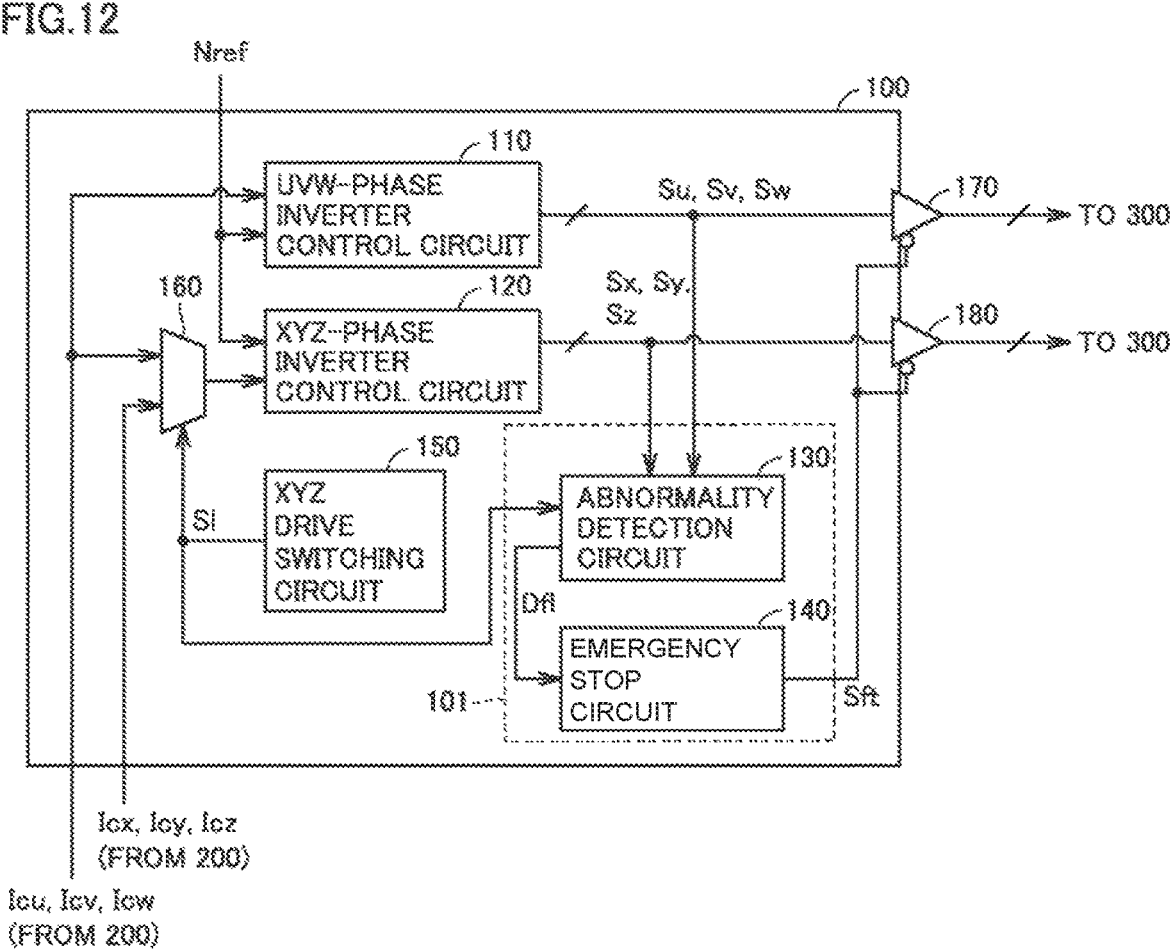
FIG. 12 is a block diagram illustrating the configuration of a motor controller in which an abnormality detection apparatus according to the second embodiment is used.

FIG. 12 is a block diagram illustrating the configuration of a motor controller in which an abnormality detection apparatus according to the second embodiment is used.

Referring to FIG. 12, in the second embodiment, motor controller 100 further includes an XYZ drive switching circuit 150 and a selector 160 in addition to the configuration in FIG. 4.

XYZ drive switching circuit 150 sets a switching signal SI at "0" or "1" based on the setting information stored in a non-volatile manner. For example, when motor controller 100 is applied to a motor including only a winding group in the UVW-phase, switching signal SI is set at "1". In contrast, when motor controller 100 is applied to controlling of a motor including a plurality of winding groups in the UVW-phase and the XYZ-phase, switching signal SI is set at "0".

Selector 160 selectively inputs one of an inverter on/off determination signal (Icx, Icy, Icz) in the XYZ-phase and an inverter on/off determination signal (Icu, Icy, Icw) in the UZW phase into XYZ-phase inverter 500.

When being applied to controlling of the motor including a plurality of winding groups in the UVW-phase and the XYZ-phase, motor current measurement circuit 200 outputs inverter on/off determination signals Icu, Icy, Icw, Icx, Icy, and Icz in the UVW-phase and the XYZ-phase. In this case, according to the condition that SI="0", selector 160 inputs inverter on/off determination signals Icx, Icy and Icz into XYZ-phase inverter control circuit 120. Consequently, motor controller 100 can perform the control operation as described in the first embodiment to control UVW-phase inverter 400 and XYZ-phase inverter 500.

In contrast, when being applied to controlling of the motor including only a winding group in the UVW-phase, motor current measurement circuit 200 outputs only inverter on/off determination signals Icu, Icy and Icw in the UVW-phase. In this case, according to the condition that SI="1", selector 160 inputs inverter on/off determination signals Icu, Icy and Icw also into XYZ-phase inverter control circuit 120. Consequently, XYZ-phase inverter control circuit 120 generates inverter control signals Sx, Sy and Sz in the XYZ-phase by the control operation using inverter on/off determination signals Icu, Icy and Icw in place of inverter on/off determination signals Icx, Icy and Icz in the first embodiment. In this case, if the control operation is normally performed, the conditions show that Su=Sx, Sv=Sy and Sw=Sz. In addition, inverter control signals Su, Sv and Sw in the UVW-phase are generated as in the first embodiment. Switching signal SI may be further input into gate circuit 180 in the XYZ-phase. Gate circuit 180 is controlled to stop the output when SI="1". By the configuration as described above, motor controller 100 can be applicable to both: the motor including a plurality of winding groups in the UVW-phase and the XYZ-phase; and the motor including only a winding group in the UVW-phase.

Figure 13:
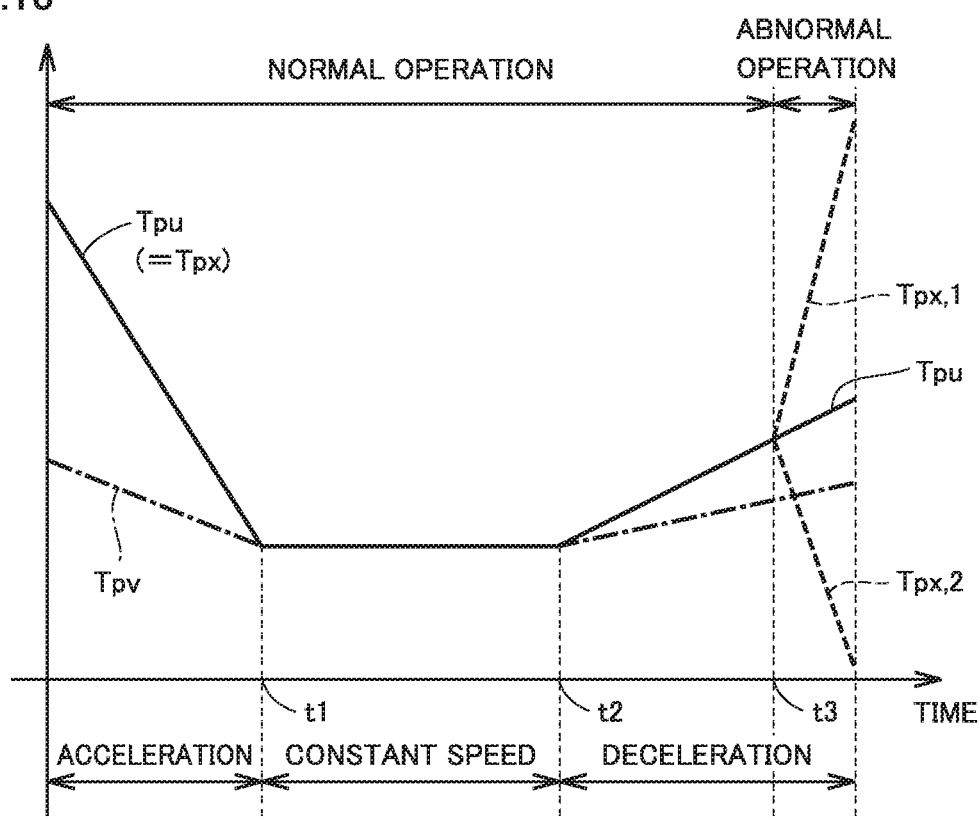
FIG. 13 is a conceptual diagram for illustrating the relation among the pulse periods of the inverter control signals in the U-phase, the X-phase and the V-phase during each of the normal operation and the abnormal operation in the configuration of the second embodiment.

FIG. 13 is a conceptual diagram for illustrating the relation among the pulse periods of the inverter control signals in the U-phase, the X-phase and the V-phase during each of the normal operation and the abnormal operation as in FIG. 9 in the configuration of the second embodiment.

Referring to FIG. 13, since the inverter control signals in the U-phase and the X-phase are the same during the normal operation until time t3, the relation shows Tpu=Tpx. Thus, in the acceleration state (until time t1), U-phase pulse period Tpu, X-phase pulse period Tpx and V-phase pulse period Tpv continuously increase while the relation of Tpu=Tpx>Tpv is maintained.

In the deceleration state (time t2 to time t3), U-phase pulse period Tpu, X-phase pulse period Tpx and V-phase pulse period Tpv continuously decrease while the relation of Tpu=Tpx>Tpv is maintained. Furthermore, in the constant speed state (time t1 to time t2), the relation shows Tpu=Tpx=Tpv as in FIG. 9.

Therefore, also in the second embodiment, it is understood that, during the normal operation, the pulse period comparison condition of Tpu≥Tpx≥Tpv in the first embodiment is satisfied among U-phase pulse period Tpu, X-phase pulse period Tpx and V-phase pulse period Tpv in the three adjacent phases.

FIG. 13 also shows an example in which an abnormality occurs in the control system in the X-phase at and after time t3. Also in this case, pulse period comparison condition Tpu>Tpx≥Tpv is not satisfied in each of "∞ abnormality" (Tpx, 1)" and "0 abnormality" (Tpx, 2)" as in FIG. 9. Also when an abnormality occur in each of Tpu=Tpx, "0 abnormality" in each of the U-phase and the X-phase can be detected due to unsatisfaction of the pulse period comparison condition of Tpu≥Tpx≥Tpv.

Consequently, also in the configuration in the second embodiment, it is understood that the same abnormality detection as in the first embodiment can be performed in each of the six combinations shown in FIG. 10 by the same pulse period comparison condition as that in the first embodiment. In the second embodiment, in order to cover for the abnormal patterns in the state where the conditions of U-phase=the X-phase, the V-phase=Y-phase and the W-phase=Z-phase are satisfied, it is preferable to compare the pulse periods of the inverter control signals among the three adjacent phases for all of the six combinations.

In other words, in the configuration of the second embodiment, abnormality detection circuit 130 can be configured in the same manner as in FIG. 7. Thus, as a result of comparing the pulse periods among three adjacent phases in the six combinations shown in FIG. 10 among U-phase pulse period Tpu, V-phase pulse period Tpv, W-phase pulse period Tpw, X-phase pulse period Tpx, Y-phase pulse period Tpy, and Z-phase pulse periods Tpz, when an abnormality is detected in any one of the combinations, an abnormality in motor control can be detected.

Also in the configuration of the second embodiment, according to the correspondence relation shown in FIG. 11, abnormality specifying circuit 138 can specify the phase having an abnormality and the abnormality details ("0 abnormality"/"∞ abnormality") based on the result of detection of an abnormality (normal/abnormal) from among the above-mentioned six combinations by period comparison circuit 137.

However, when SI="1" in the second embodiment, the XYZ-phase is not used for motor control, and thus, the control operation is to be performed for abnormality detection. Accordingly, in the case where abnormality specifying circuit 138 specifies that an abnormality occurs in the X-phase, the Y-phase or the Z-phase when abnormality detection circuit 130 detects an abnormality, only warning information is output but the emergency stop operation of setting an emergency stop signal Sft at "1" does not have to be performed.

In this way, the abnormality detection apparatus according to the present embodiment can be applicable also to a motor controller that is applicable not only to a motor including a plurality of winding groups in the UVW-phase and the XYZ-phase but also to a motor including only a winding group in the UVW-phase, and further can implement the abnormality detection function of the control operation in motor controller 100 without duplexing the control operation.

The first and second embodiments have been described with reference to the configuration in which abnormality detection apparatus 101 is incorporated in motor controller 100 such that motor controller 100 has a self-diagnosis function. However, abnormality detection apparatus 101 may be provided separately from motor controller 100 and configured to receive the inverter control signals in the UVW-phase and the XYZ-phase from motor controller 100 so as to detect an abnormality in motor controller 100.

It should be understood that the embodiments disclosed herein are illustrative and non-restrictive in every respect. The scope of the present disclosure is defined by the terms of the claims, rather than the description above, and is intended to include any modifications within the meaning and scope equivalent to the terms of the claims.

REFERENCE SIGNS LIST 10 motor system, 20 DC power supply, 100 motor controller, 101 abnormality detection apparatus, 110 UVW-phase inverter control circuit, 120 XYZ-phase inverter control circuit, 112 carrier wave generation circuit, 114 voltage command operation circuit, 115 PWM operation circuit, 130 abnormality detection circuit, 131 to 136 period measurement circuit (UVW-phase, XYZ-phase), 137 period comparison circuit, 138 abnormality specifying circuit, 140 emergency stop circuit, 150 drive switching circuit, 160 selector, 170, 180 gate circuit, 200 motor current measurement circuit, 300 pre-driver, 400 UVW-phase inverter, 500 XYZ-phase inverter, 601 to 606 current detector, 700 motor, 710 rotor, 720 stator, 731 to 736 winding (UVW-phase, XYZ-phase), CWu, CWv, Cwu carrier wave, Icu, Icy, Icw, Icx, Icy, Icz inverter on/off determination signal, Iu, Iv, Iw, Ix, Iy, Iz motor current (each phase), Nref target rotation speed, SI switching signal, Su, Sv, Sw, Sx, Sy, Sz inverter control signal, Sul, Suu, Svl, Svu, Swl, Swu, Sxl, Sxu, Syl, Syu, Szl, Szu, drive control signal, Tpu pulse period, Tpu, Tpv, Tpw, Tpwm, Tpx, Tpy, Tpz pulse period, Vu* voltage command value.

The invention claimed is:

1. An abnormality detection apparatus used for a motor controller having a function of controlling a motor including a plurality of windings each disposed in a corresponding one of a plurality of phases arranged in a predetermined order, the plurality of windings being divided into a first winding group and a second winding group that are insulated from each other, the abnormality detection apparatus comprising:

a first period measurement circuit to receive a plurality of first control signals to a first power converter for controlling a voltage applied to the first winding group; and a second period measurement circuit to receive a plurality of second control signals to a second power converter for controlling a voltage applied to the second winding group, in each of phases corresponding to the first winding group among the plurality of phases, the plurality of first control signals each being generated as a pulse signal having a period depending on a rotation speed of the motor based on a current detected in each of the phases corresponding to the first winding group in the motor, in each of phases corresponding to the second winding group among the plurality of phases, the plurality of second control signals each being generated as a pulse signal having a period depending on a rotation speed of the motor based on a current detected in each of the phases corresponding to the second winding group in the motor, the first period measurement circuit being configured to measure pulse periods of the plurality of first control signals, the second period measurement circuit being configured to measure pulse periods of the plurality of second control signals, the abnormality detection apparatus further comprising:

a period comparison circuit to detect an abnormality in the motor controller based on a comparison of the pulse periods of the plurality of first control signals or the pulse periods of the plurality of second control signals in the plurality of phases, the pulse periods of the plurality of first control signals being measured by the first period measurement circuit, and the pulse periods of the plurality of second control signals being measured by the second period measurement circuit, the period comparison circuit, being configured to detect whether the abnormality occurs or not depending on whether a predetermined large-small relation according to an arrangement order of the plurality of phases is established or not among the pulse periods of the plurality of phases during at least one of an acceleration state time period and a deceleration state time period of the motor.

2. The abnormality detection apparatus according to claim 1, wherein the first winding group is disposed so as to correspond to a U-phase, a V-phase and a W-phase, the second winding group is disposed so as to correspond to: an X-phase arranged between the U-phase and the V-phase; a Y-phase arranged between the V-phase and the W-phase; and a Z-phase arranged between the W-phase and the U-phase, and the period comparison circuit is configured to detect whether the abnormality occurs or not depending on whether the large-small relation is established or not among the pulse periods of three control signals of the plurality of first control signals and the plurality of second control signals, the three control signals being in three adjacent phases in an arrangement order among the U-phase, the X-phase, the V-phase, the Y-phase, the W-phase, and the Z-phase.

3. The abnormality detection apparatus according to claim 2, wherein the period comparison circuit is configured to detect an abnormality in the motor controller when the large-small relation is not established among the pulse periods of the three control signals in at least one of a plurality of combinations of three control signals in three adjacent phases in the arrangement order among the U-phase, the X-phase, the V-phase, the Y-phase, the W-phase, and the Z-phase.

4. The abnormality detection apparatus according to claim 3, further comprising an abnormality specifying circuit to specify a phase having an abnormality from among the plurality of phases based on a comparison result by the period comparison unit circuit, wherein the abnormality specifying circuit specifies a phase having an abnormality from among the plurality of phases based on whether the large-small relation is established or not among the pulse periods of the three control signals in one of the plurality of combinations in the comparison result.

5. The abnormality detection apparatus according to claim 2, wherein the motor controller is configured to have a control mode for controlling a motor having only phases corresponding to the first winding group among the plurality of phases by generating each of the plurality of first control signals and the plurality of second control signals based on a current in each of the phases corresponding to the first winding group, and in a case where the control mode is applied to the motor controller, the period comparison circuit detects an abnormality in the motor controller when the large-small relation is not established among the pulse periods of three control signals in the three adjacent phases in the arrangement order in at least one of a plurality of combinations each including the three control signals.

* * * * *